Nov. 18, 1969  R. R. FUEHRER ETAL  3,478,852
RADIAL SUPPORT STRUCTURE FOR CLUTCH HUBS
Filed Jan. 4, 1968
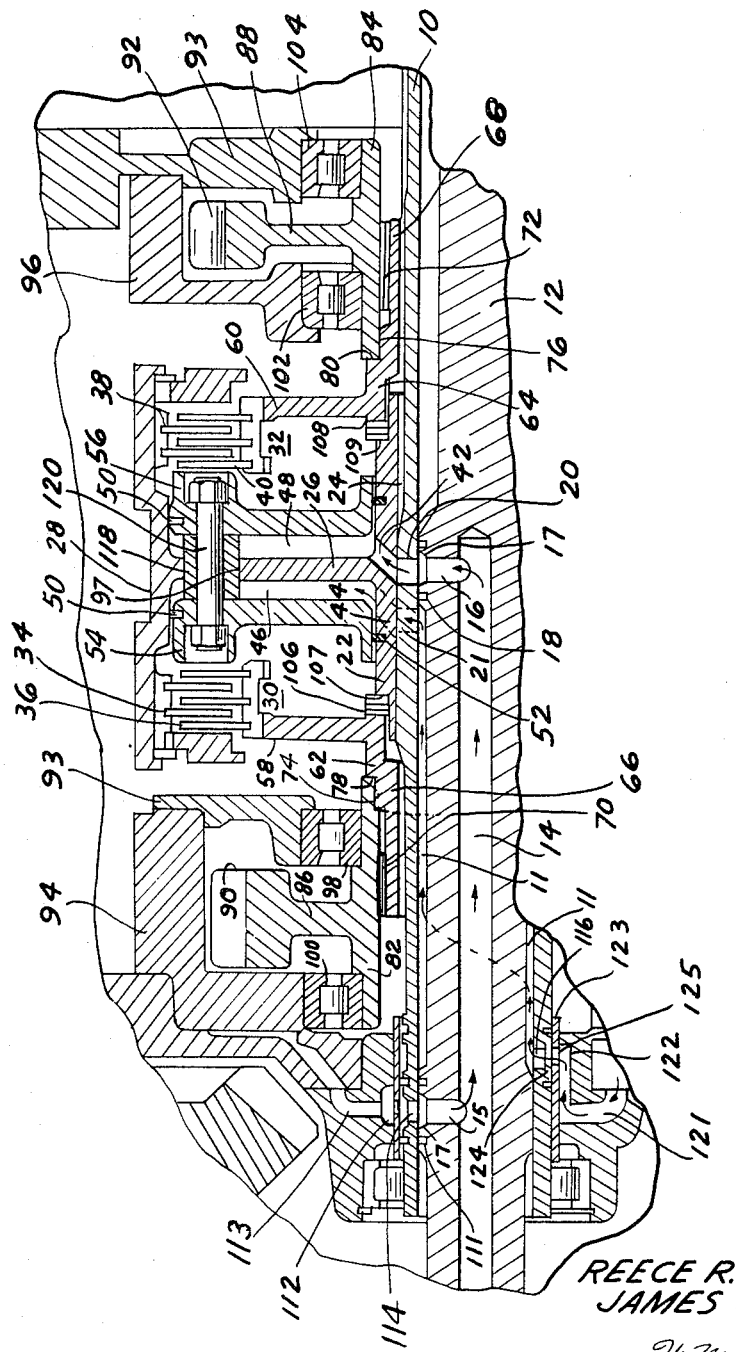
REECE R. FUEHRER
JAMES C. POLAK
INVENTORS
BY H. M. Saragovitz
E. J. Kelly, H. Berl
and R. M. Lyon
ATTORNEYS United States Patent Office 3,478,852
Patented Nov. 18, 1969

3,478,852
RADIAL SUPPORT STRUCTURE FOR
CLUTCH HUBS
Reece R. Fuehrer, Danville, and James C. Polak, Indianapolis, Ind., assignors, by mesne assignments, to the United States of America as represented by the Secretary of the Army
Filed Jan. 4, 1968, Ser. No. 695,665
Int. Cl. F16d 11/00, 13/68, 21/08
U.S. Cl. 192—110         3 Claims

ABSTRACT OF THE DISCLOSURE

A forward-reverse hydraulically operated clutch having clutch hubs which are radially supported by individual output gears. The clutch hubs each include an axially extending sleeve to provide a registering diametral fit between the clutch hub and its respective output gear. The output gears are journaled in the clutch housing.

This invention relates a forward-reverse clutch unit and in particular to the means by which the clutch hub is connected to the output gear.

Hydraulically operated clutches are generally old and well known in the art. These prior art devices are generally known to include one or more sets of interleaved clutch packs which are hydraulically controlled. In the past, the clutch hub members were radially supported through an anti-frictional rolling element mounted on the inner portion of the clutch drum. The clutch drum, in turn, derived its radial support from the central shaft which was supported by bearings mounted in the power train housing outboard of the clutch unit. This prior art method of mounting the clutch hub resulted in relatively large power loses and inadequate support for the clutch hub and central shaft. Another deleterious effect of this prior art method was the unacceptably high differential speed of the anti-frictional rolling element caused by the equal but opposite rotation of the clutch hub with respect to the clutch drum of the released clutch.

The present invention is directed to a new and improved forward-reverse clutch unit which eliminates the conventional bearings between the clutch hub and the central or input shafts. The instant invention provides for a clutch hub which has an axially extending sleeve and which receives its radial support from an output gear which encompasses the axially extending sleeve. The clutch hub derives axial location and support from a thrust bearing which is located intermediate the clutch hub and the inner hub of the conventional clutch drum. The clutch hub is further restrained axially by the inner hub of the output gear which abuts an axially extending flange which is integrally formed with the clutch hub.

It is therefore one of the objects of the present invention to eliminate the aforesaid disadvantages.

It is another one of the objects of the present invention to provide a new and improved clutch unit which is simple, reliable, and relatively inexpensive.

It is yet another object of the present invention to provide a forward-reverse clutch unit with a new and novel means for connecting the clutch hub to the output gear.

It is still another object of the present invention to provide a new and improved drive connection between the clutch hub and output drive means of a forward-reverse clutch unit.

It is further object of the present invention to provide a new and improved means of supporting the clutch hubs in a hydraulically operated clutch assembly.

It is a still further object to eliminate the use of anti-frictional rolling elements as a journal means for a clutch hub.

Other objects and advantages of the present invention will become apparent to those of ordinary skill in the art by the following description when considered in relation to the accompanying drawing which is represented in the single figure shown partly in section.

Referring now to the single figure of the drawing, tubular input shaft 10 is connected to any suitable power source or prime mover such as an internal combustion engine, not shown. Mounted within the internal bore 11 of shaft 10 is central shaft 12 having an elongated bore 14 therein. As will be described hereinafter, bore 14 of shaft 12 and bore 11 of shaft 10 are connected to at least one suitable hydraulic fluid source or pump. In fluid communication with bore 14 are radially extending ports 16 and grooves 17 which are formed in shaft 12. Grooves 17 communicate with radially extending ports 20 which are formed in shaft 10. Shown in dotted lines are radially extending ports 21 which are in fluid communication with bore 11. As shown in the drawing, seals 18 are provided on either side of ports 16 to prevent undesired leakage. As will be more fully explained hereinafter, fluid may be selectively directed through bores 11 or 14 to either ports 21 or 20 to fill cavities 46 or 48 as desired.

Mounted externally of shaft 10 is clutch drum 28 having clutch plates 34 and 38 and a reaction plate 26 which is integrally formed with inner hub 22. Splines 24 are formed on hub 22 and shaft 10 such that reaction plate 26 and clutch drum 28 are drivingly connected to shaft 10. Via means of ports 42 and 44, cavities 46 and 48 are in fluid communication with ports 20 and 21 respectively. Indicated generally at 30 is a schematic representation of the forward clutch pack comprising intermeshing clutch plates 34 and 36. Similarly indicated generally at 32 is a schematic representation of the reverse clutch pack comprising intermeshing clutch plates 38 and 40. The radially outermost portion of drum 28 and clutch packs 30 and 32 are not shown in detail in that their form, function and purpose are well known in the art.

Mounted within clutch drum 28 and externally or hub 22 are annular pistons 54 and 56 which are axially movable. Annular seals 50 are provided to effect a seal between pistons 54 and 56 and drum 28. Mounted on hub 22 are annular seals 52 to prevent leakage of hydraulic fluid between pistons 54 and 56 and hub 22.

The bolts 120 attach the pistons 54 and 56 to sleeve 118, which sleeve is slidingly engaged within bore 97 formed in reaction plate 26. Thus, the pistons 54 and 56 are connected as a unit which is rotationally fixed to the hub plate 26 but which is free to reciprocate axially relative to the plate for alternate application of the clutches 30 or 32. If hydraulic fluid is directed into port 42, the increased pressure in cavity 48 will cause piston 56 to move axially toward clutch pack 32, while piston 54 moves axially away from 30. If sufficient fluid is communicated to cavity 48, piston 56 will engage the clutch plates forming the clutch pack 32. Similarly, fluid may be directed into cavity 46 to cause piston 54 to move axially into engagement with the clutch plates forming the clutch pack 30 and piston 56 moves axially away from clutch pack 32.

Clutch plates, shown schematically at 30, are mounted on clutch hub 58 which has an axially extending flange 62 and sleeve 66. Sleeve 66 which is annular in configuration has splines 70 formed therein which engage corresponding splines formed in gear hub 82 of output gear 86. Sleeve 66 and flange 62 are preferably formed as an integral part of hub 58. If desired, however, they may be formed separately and mechanically secured in any suitable manner. The housing or frame, depicted at 93, and support housing 94 are utilized to support bearings 98 and 100 in which hub 82 is journaled. Teeth 90 are formed in output gear 86 and engage a driven output gear, not shown. Thus it can be seen that housing 22 and support housing 94 radially support gear 86 and clutch hub 58 through splines 70 and a close diametral fit as shown at 74. Clutch hub 58 is restrained axially by needle thrust bearing 106 and shoulder 78 of flange 62 which abuts hub 82. Thrust bearing 106 is rigidly secured against axial movement by shoulder 107 of hub 22.

Similarly situated on the opposite side of reaction plate 26 are clutch plates, schematically represented at 32, which are part of reverse clutch pack 32 and supported by reverse clutch hub 60. Flange 64 and sleeve 68 form an integral part of hub 60, however, if desired, flange 64 and sleeve 68 may be individually formed and subsequently assembled. Splines 72 formed in sleeve 66 are drivingly connected to corresponding splines in gear hub 84 of output gear 88. The basic support for the hub 60 is frame 93 and support housing 96 which is rigidly secured to frame 93 in any suitable manner. Hub 84 is journaled in bearings 102 and 104 which are radially supported by frame 93 and support housing 96. Teeth 92 of gear 88 engage a further output gear, not shown, for purposes of obtaining reverse power. Hub 60 is restrained radially by splines 72 and a close diametral fit between sleeve 68 and hub 84 as shown at 76. Axial support and restraint for hub 60 is derived from shoulder 80 of flange 64 which abuts hub 84 and needle thrust bearing 108 which is restrained by shoulder 109 of hub 22.

It is to be noted that the gear hubs 84 and 82 are axially located by the frame members 96 and 94 respectively via the combination of bearings 102-104 and 100-98. Also the frame members 86 and 94 derive their location from a common part 93. Thus the parts 62, 106, 22, 108 and 64 are trapped axially between the inner faces of the hubs 82 and 84.

Structure is provided to enable the hydraulic fluid to be selectively communicated to either bore 11 or bore 14. Bore 14 is in fluid communication with radially extending ports 15 and groove 17, both of which are formed in shaft 12. Seals 111 are provided on the inner and outer diameters of shaft 10 and either side of radially extending ports 114. Ports 114 are in fluid communication with groove 17 on the inner surface of shaft 10 and with cavity 112 on the outer surface of shaft 10. A tubular member 113 is connected to a suitable hydraulic source or pump which directs fluid into port 15, bore 14, ports 16, 20 and 42 into cavity 48.

Bore 11 is in fluid communication with ports 116 and groove 124 which are both formed in shaft 10. A port 125 is formed in sleeve 123 to enable the hydraulic fluid to pass from slot 122 which is formed in the housing. Slot 122 extends axially and is in fluid communication with tubular member 121 which is attached to a suitable hydraulic source or pump, not shown. Preferably, the same hydraulic pump is the source for supplying fluid to both chambers 46 and 48, however, separate sources may be utilized if desired. Seats 111 are conveniently provided between shaft 10 and sleeve 123 to prevent undesired leakage about ports 125. As shown by the arrows, fluid flows through tubular member 121, slot 122, ports 125 and 116, into bore 11 and around inner shaft 12, through ports 21 and 44 into cavity 46. This passage of fluid to bore 11 and cavity 46 is separate and distinct from fluid passage to bore 14 and cavity 48. Slot 122 is local, as shown in the drawing, and isolated from cavity 112, hence, fluid from tubular member 121 cannot enter bore 14 and cavity 48.

In operation, the clutch assembly can deliver forward or reverse power depending on whether forward or reverse clutch packs 30 or 32 respectively are engaged. As mentioned previously, selective engagement of either clutch pack is possible dependent upon whether hydraulic fluid is delivered to cavity 46 or 48. If hydraulic fluid is directed down bore 11 of shaft 10, and into ports 21 and 44, the increased pressure will cause piston 54 to engage the plates of clutch pack 30. When clutch pack 30 is engaged, forward rotative power will be transmitted from shaft 10 through clutch drum 28, clutch pack 30, and clutch hub 58 to output gear 86. The output power delivered by gear 86 will be effective to drive the vehicle in the forward direction. If, on the other hand, it is desired that the vehicle travel in the reverse direction, output power is coupled to gear 88 from input shaft 10, clutch drum 28, clutch pack 32 and clutch hub 60.

The new and improved power transmitting device according to the invention has provided positive power transmission with elimination of at least one set of bearings for each clutch hub with increased support for the shaft, output gearing, and clutch hubs. The improved clutch hub with integral flange 64 and sleeve 68 has improved efficiency over prior art devices due to elimination of linkages which increase power loss. This new and improved clutch assembly maintains support of the clutch hub through the output gearing rather than the input or central shafts as was previously known in the art. This departure from past practice has provided a greatly improved clutch assembly. Moreover, the invention has eliminated the use of ball bearings which were subjected to an extremely high speed due to the differential velocity of the rotating members.

Since it is obvious that many changes and modifications can be made in the above described details without departing from the nature and spirit of the invention, it is to be understood that the invention is not limited to said details except as set forth in the appended claims.

What we claim is:

1. In a forward-reverse hydraulically operated dual clutch assembly the combination comprising:
   a support housing having provisions for mounting a horizontal central shaft;
   a tubular input shaft mounted in coaxial relation about said central shaft, said input shaft suitably connected to a power source;
   a driven clutch member having an outer dual annular drum and an inner hub portion both formed integral with a central radial reaction plate portion, said inner hub being drivingly connected to said input shaft;
   first and second axially spaced driving clutch packs mounted in coaxial relation on said input shaft and each located in under lapping relationship respectively with an end of said annular dual drum, said clutch packs being adapted to selectively transmit power from said input shaft to first and second output gears respectively,
   said first and second clutch packs each having an annular sleeve rotatable about said input shaft, each said sleeve having integral therewith an axially directed and laterally offset annular flange forming outwardly and inwardly facing radial shoulders,
   each said first and second clutch pack having a radial web integral with the offset flange and having an inwardly directed annular clutch hub integral with said radial web, the clutch hubs having clutch plates secured on their outer periphery for intermeshing with cooperating clutch plates on the inner periphery of said outer drum,
   said first and second output gears axially displaced outwardly respectively from their associated clutch pack, each said output gear having its hub in positive coaxial engagement with clutch pack sleeve;
   each said output gear journalled in bearings positioned between said support housing an said output gear hub with the inward end of said hub positioned in abutting relation with the outwardly facing shoulder of its associated clutch pack annular flange, said driven drum hub having notched end portions to mate in scarf joint relation with the inwardly facing flange shoulder of its associated clutch pack and a thrust bearing located between the annular flange shoulder and the opposed vertical face of the notch;

each said sleeve and its associated gear hub being contiguous so as to form a registering diametral fit adjacent the inboard end of the clutch pack sleeve such that the clutch packs receive their radial support solely from their associated output gear and their axial support from their associated thrust bearings and output gear hubs.

2. A clutch mechanism according to claim 1 wherein intermeshing splines are formed in the outboard end of the clutch pack sleeves and their associated output gear hubs for positive transmission of output power.

3. A clutch mechanism according to claim 1 wherein the thrust bearings are needle bearings.

References Cited

UNITED STATES PATENTS

| 1,177,661 | 4/1916 | Svensen | 192—110 XR |
| 1,672,582 | 6/1928 | Tenney | 192—110 XR |
| 1,928,301 | 9/1933 | Dierson | 192—110 XR |
| 2,056,050 | 9/1936 | Harris | 192—20 XR |
| 2,400,835 | 5/1946 | Levin | 192—20 XR |
| 2,841,023 | 7/1958 | Gorshkoff | 192—87.17 XR |
| 2,916,930 | 12/1959 | Gorshkoff et al. | 192—87.17 XR |
| 2,979,176 | 4/1961 | Voth | 192—87.17 |
| 3,093,227 | 6/1963 | Straub et al. | 192—110 |
| 3,199,648 | 8/1965 | Schwab | 192—87.17 |
| 3,391,767 | 7/1968 | Stow | 192—87.17 |

MARTIN P. SCHWADRON, Primary Examiner

L. J. PAYNE, Assistant Examiner

U.S. Cl. X.R.

192—87.15, 87.16, 115